(12) United States Patent
Glickman et al.

(10) Patent No.: US 11,414,135 B2
(45) Date of Patent: Aug. 16, 2022

(54) MOVEABLE REINFORCEMENT ASSEMBLY FOR MOTOR VEHICLE

(71) Applicant: Ford Global Technologies, LLC, Dearborn, MI (US)

(72) Inventors: David Brian Glickman, Southfield, MI (US); Mark A. Wisneski, Dearborn, MI (US); Lance Coley, Highland, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 153 days.

(21) Appl. No.: 16/992,293

(22) Filed: Aug. 13, 2020

(65) Prior Publication Data

US 2022/0048577 A1 Feb. 17, 2022

(51) Int. Cl.
*B62D 25/12* (2006.01)
*B62D 25/10* (2006.01)
*B62D 25/08* (2006.01)

(52) U.S. Cl.
CPC ........... *B62D 25/12* (2013.01); *B62D 25/082* (2013.01); *B62D 25/105* (2013.01)

(58) Field of Classification Search
CPC .... B62D 25/12; B62D 25/082; B62D 25/105; B62D 25/08; B62D 27/06
USPC ........................................ 296/187.01, 193.11
See application file for complete search history.

(56) References Cited

U.S. PATENT DOCUMENTS

| | | | |
|---|---|---|---|
| 7,296,845 B2* | 11/2007 | Seksaria | B62D 25/105 |
| | | | 296/193.11 |
| 8,056,964 B2 | 11/2011 | Schafer | |
| 8,894,128 B2* | 11/2014 | Barral | B62D 29/005 |
| | | | 49/501 |
| 8,931,824 B2 | 1/2015 | Lopez et al. | |
| 9,126,633 B2* | 9/2015 | Cho | B62D 25/082 |
| 9,539,934 B2* | 1/2017 | Fortin | B60R 19/52 |
| 10,836,437 B2* | 11/2020 | Murray | B62D 25/087 |
| 11,142,129 B2* | 10/2021 | Howard, II | B60R 11/0217 |
| 2006/0158007 A1* | 7/2006 | Seksaria | B62D 25/105 |
| | | | 296/193.11 |
| 2020/0317135 A1* | 10/2020 | Liu | B60R 5/02 |
| 2022/0097341 A1* | 3/2022 | Kossanyi | B32B 5/02 |

FOREIGN PATENT DOCUMENTS

| | | | |
|---|---|---|---|
| CN | 107200069 B | * 5/2019 | |
| DE | 102008004310 A1 | 7/2008 | |
| JP | 2012011977 A | 1/2012 | |
| WO | WO-2018161694 A1 | * 9/2018 | ............. B62D 25/08 |
| WO | WO-2018162146 A1 | * 9/2018 | ............... B60R 5/02 |
| WO | 2019150639 A1 | 8/2019 | |

\* cited by examiner

*Primary Examiner* — Pinel E Romain

(74) *Attorney, Agent, or Firm* — Vichit Chea; Carlson, Gaskey & Olds, P.C.

(57) ABSTRACT

This disclosure relates to a moveable reinforcement assembly for a motor vehicle, such as a motor vehicle with a front trunk (i.e., a "frunk"). An example vehicle includes a front end assembly, a panel moveable relative to the front end assembly between a closed position and an open position, and a reinforcement assembly mounted to the panel and configured to interface with the front end assembly when the panel is in the closed position. The reinforcement assembly effectively absorbs and transfers loads applied thereto while also being moveable so as to not obstruct access to a front trunk.

18 Claims, 8 Drawing Sheets

(12)  MOVEABLE REINFORCEMENT ASSEMBLY FOR MOTOR VEHICLE

TECHNICAL FIELD

This disclosure relates to a moveable reinforcement assembly for a motor vehicle, such as a motor vehicle with a front trunk (i.e., a "frunk").

BACKGROUND

Motor vehicles include reinforcement structures arranged at forward locations of the motor vehicle, such as in front of a dash panel. These structures, sometimes referred to as front ends or front end assemblies, serve a number of functions. Among them, front end assemblies absorb loads applied to the front of the vehicle.

SUMMARY

A motor vehicle according to an exemplary aspect of the present disclosure includes, among other things, a front end assembly, a panel moveable relative to the front end assembly between a closed position and an open position, and a reinforcement assembly mounted to the panel and configured to interface with the front end assembly when the panel is in the closed position.

In a further non-limiting embodiment of the foregoing motor vehicle, the front end assembly includes a first component and a second component spaced-apart from the first component, and, when the panel is in the closed position, the reinforcement assembly is configured to interface with both the first component and second components.

In a further non-limiting embodiment of any of the foregoing motor vehicles, the front end assembly includes a cross member extending from the first component to the second component, and, when the panel is in the closed position, the reinforcement assembly extends in a direction substantially parallel to the cross member.

In a further non-limiting embodiment of any of the foregoing motor vehicles, at least one of the first component and the second component includes a channel, and the reinforcement assembly includes a tab configured such that, when the panel is in the closed position, the tab projects into the channel.

In a further non-limiting embodiment of any of the foregoing motor vehicles, the tab includes a hook.

In a further non-limiting embodiment of any of the foregoing motor vehicles, at least one of the first component and the second component includes a pin, and the reinforcement assembly includes a tab having a slot configured such that, when the panel is in the closed position, the slot receives the pin.

In a further non-limiting embodiment of any of the foregoing motor vehicles, at least one of the first component and the second component includes a channel and a tab projecting partially into the channel, and the reinforcement assembly includes a pin and a collar on the pin configured such that, when the panel is in the closed position, the collar surrounds the tab.

In a further non-limiting embodiment of any of the foregoing motor vehicles, at least one of the first component and the second component includes a gap in a front-facing surface thereof, and the reinforcement assembly includes a pin projecting from a rear-facing surface thereof and configured such that, when the panel is in the closed position, the pin projects into the gap.

In a further non-limiting embodiment of any of the foregoing motor vehicles, the at least one of the first component and the second component includes a first surface and a second surface substantially parallel to one another and spaced-apart from one another by a an inclined surface lying in a plane non-perpendicular to planes containing the first and second surfaces, the reinforcement assembly includes a first surface and a second surface substantially parallel to one another and spaced-apart from one another by a an inclined surface lying in a plane non-perpendicular to planes containing the first and second surfaces, the gap is formed in the first surface of the at least one of the first component and the second component, and the pin projects rearward of the first surface of the reinforcement assembly.

In a further non-limiting embodiment of any of the foregoing motor vehicles, the at least one of the first component and the second component includes a T-shaped slot, and the reinforcement assembly includes a T-shaped tab configured such that, when the panel is in the closed position, the T-shaped tab is partially received in the T-shaped slot.

In a further non-limiting embodiment of any of the foregoing motor vehicles, the at least one of the first component and the second component includes a pivoting lock, and the reinforcement assembly is configured to engage the pivoting lock such that, as the panel rotates to the closed position, the pivoting lock engages a channel in the reinforcement assembly and rotates into a locking position.

In a further non-limiting embodiment of any of the foregoing motor vehicles, the reinforcement assembly is provided by a bar.

In a further non-limiting embodiment of any of the foregoing motor vehicles, the bar exhibits a substantially rectangular cross-section.

In a further non-limiting embodiment of any of the foregoing motor vehicles, a front surface of the bar includes at least one roll-formed bead.

In a further non-limiting embodiment of any of the foregoing motor vehicles, the bar includes a front section, a first rearwardly-extending section projecting from a first side of the front section, and a second rearwardly-extending section projecting from a second side of the front section opposite the first side.

In a further non-limiting embodiment of any of the foregoing motor vehicles, the vehicle further includes a front trunk arranged within the front end assembly. The panel is configured to selectively cover and uncover the front trunk.

In a further non-limiting embodiment of any of the foregoing motor vehicles, the front trunk includes a front wall, rear wall, first and second side walls, and a bottom wall, and the front wall projects a lower height above the bottom wall than the rear wall.

In a further non-limiting embodiment of any of the foregoing motor vehicles, the panel is a hood.

An assembly for a motor vehicle according to an exemplary aspect of the present disclosure includes, among other things, a front trunk including a front wall, rear wall, first and second side walls, and a bottom wall. The front wall projects a lower height above the bottom wall than the rear wall. The assembly further includes a front end assembly including a first component adjacent the first side wall of the front trunk, a second component adjacent the second side wall of the front trunk, and a cross member extending from the first component to the second component. The assembly also includes a hood moveable relative to the front end assembly between a closed position and an open position to selectively cover and uncover the front trunk, and a bar mounted to the hood and configured such that, when the hood is in the closed position, the bar interfaces with the first and second components of the front end assembly and extends in a direction substantially parallel to the cross member.

In a further non-limiting embodiment of the foregoing assembly, the bar exhibits a substantially rectangular cross-section, a front surface of the bar includes at least one roll-formed bead, and the bar includes a front section, a first rearwardly-extending section projecting from a first side of the front section, and a second rearwardly-extending section projecting from a second side of the front section opposite the first side.

BRIEF DESCRIPTION OF THE DRAWINGS

In FIG. 16, a pivoting lock is open facing an upward direction and the bar is spaced-apart above the pivoting lock.

In FIG. 17, the bar has lowered relative to FIG. 16 and the pivoting lock has rotated relative to the position of FIG. 16 such that the pivoting lock is received in a channel of the bar.

DETAILED DESCRIPTION

This disclosure relates to a moveable reinforcement assembly for a motor vehicle, such as a motor vehicle with a front trunk (i.e., a "frunk"). An example vehicle includes a front end assembly, a panel moveable relative to the front end assembly between a closed position and an open position, and a reinforcement assembly mounted to the panel and configured to interface with the front end assembly when the panel is in the closed position. The reinforcement assembly effectively absorbs and transfers loads applied thereto while also being moveable so as to not obstruct access to a front trunk. These and other benefits will be appreciated from the below description.

Figure 1:
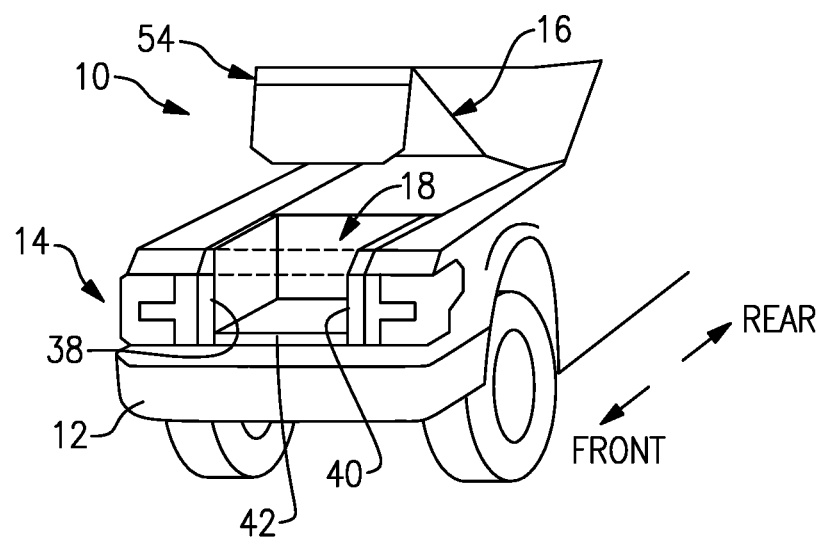
FIG. 1 is a front-perspective view of an motor vehicle, which in this example includes a front trunk.

FIG. 1 illustrates a motor vehicle 10 ("vehicle 10"), which in this example is a pickup truck. While a pickup truck is shown in FIG. 1, this disclosure extends to other types of vehicles, such as sport utility vehicles (SUVs). The vehicle 10 includes a front bumper 12 and forward-facing fascia 14, such as a grille, vertically above the front bumper 12 and below a moveable panel, which in this example is a hood 16, of the vehicle 10. The hood 16 may include one or more pieces of fascia configured to fit relative to the forward-facing fascia 14 to provide the vehicle 10 with a uniform appearance. The "front" and "rear" directions are labeled in some figures for ease of reference.

The hood 16 is moveable between an open position (FIG. 1) and a closed position to selectively uncover and cover a front trunk, or "frunk," 18. The front trunk 18 is a storage compartment situated forward of the passenger compartment of the vehicle 10. Front trunks are typically present in mid-engined or electrified vehicles. In a particular example, the vehicle 10 is an electrified vehicle that does not have a traditional internal combustion engine, and thus there is additional space forward of the passenger compartment that can be used for storage.

Figure 2:
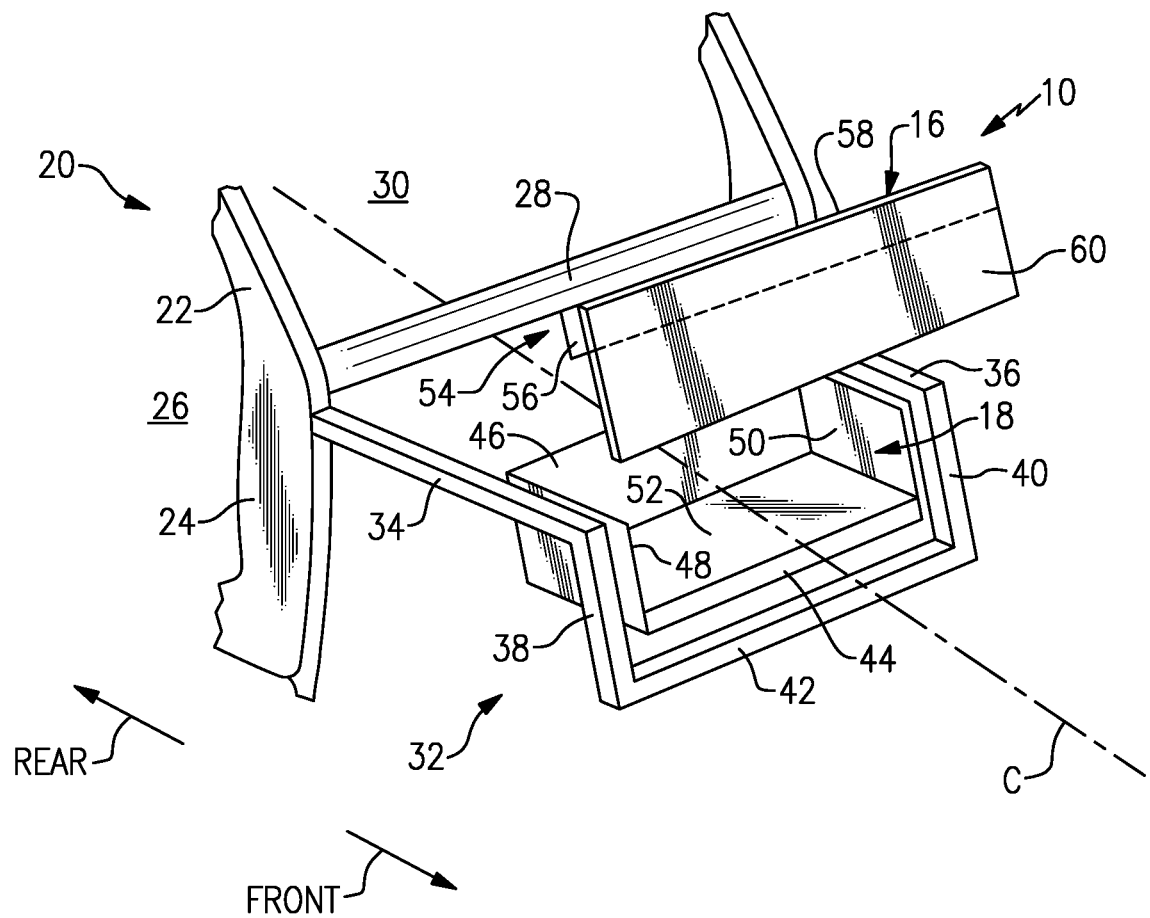
FIG. 2 is a front-perspective view of additional body structures of the vehicle, including additional detail of the hood and the front end assembly of the vehicle.

FIG. 2 illustrates additional detail of the body structures of the vehicle 10 relative to the hood 16 and the front trunk 18. In particular, in this example, a body structure 20 of the vehicle 10 includes, among other parts, an A-pillar 22 and a hinge pillar 24 (which is sometimes referred to as an A-pillar tower reinforcement) configured to connect to a door hinge. In FIG. 2, the A-pillar 22 and hinge pillar 24 partially circumscribe an opening 26, namely a passenger door opening. While the passenger side of the body structure 20 is shown and described relative to FIG. 2, it should be understood that the body structure 20 is substantially symmetrical about the centerline C of the vehicle 10, and that the body structure 20 includes substantially similar structures on the driver side of the body structure 20.

Between the passenger and driver sides of the body structure 20, the body structure 20 includes a dash panel 28, which includes a length dimension extending substantially perpendicular to the centerline C. The dash panel 28 is a component of the body structure 20 that provides a front boundary of a passenger compartment, or passenger cabin, 30. In one example, the dash panel 28 separates the passenger compartment 30 from a front end assembly 32 of the vehicle 10, which here includes the front trunk 18.

Structures that are forward (i.e., in the "front" direction), or mostly forward, of the dash panel 28 are sometimes collectively referred to as the front end assembly 32, or front end, of the vehicle 10. In this disclosure, components of the front end assembly 32 perform a number of functions, including supporting, either directly or indirectly, the front trunk 18, various pieces of fascia, including the forward-facing fascia 14, various body panels of the vehicle, and a number of other structures, such as bumper mounts, a bumper, a grille, headlamps, etc. The front end assembly 32 is also configured to transfer loads applied to the front of the vehicle 10, such as loads applied to the bumper 12, to the A-pillar 22 and/or hinge pillar 24 where they are absorbed. In this respect, the front end assembly 32 provides a load path. In a particular aspect of this disclosure, the front end assembly 32 may provide a secondary load path, as the front end may include other structures that transfer loads to rearward portions of body structure 20.

In this disclosure, the front end assembly 32 includes a plurality of components, some of which will be discussed below. As shown in FIG. 2, the front end assembly 32 includes first and second side components 34, 36 arranged generally on opposite sides of the centerline C and extending substantially parallel to the centerline C. The first and second side components 34, 36 extend forward of a respective hinge pillar to first and second vertical components 38, 40. The first and second vertical components 38, 40 may be referred to as bolsters in some examples. The first and second vertical components 38, 40 extend vertically downward from the first and second side components 34, 36 to a cross member 42. The cross member 42 connects bottom ends of the first and second vertical components 38, 40 by extending between the bottom ends of the first and second vertical components 38, 40 across the centerline C of the vehicle 10. The first and second side components 34, 36, first and second vertical components 38, 40, and cross member 42 may be formed of a single piece or multiple pieces of a metallic material, such as aluminum (Al). While aluminum is mentioned, this disclosure extends to components made of other materials, however.

The front trunk 18 in this example is arranged mostly, or totally, rearward of the cross member 42 and inward of the first and second side components 34, 36. The front trunk 18 includes a front wall 44, rear wall 46, first and second side walls 48, 50, and a bottom wall 52. The front trunk 18 is open in the upward direction. The front trunk 18 is bound from an upper location by the hood 16 when the hood 16 is closed. The front wall 44 projects a lower height above the bottom wall 52 than the rear wall 46 (i.e., the front wall 44 is shorter than the bottom wall 52). A front wall 44 is not present in some examples, and in those examples the front trunk 18 is substantially open in the upward and forward directions. In either case, with a relatively low front wall 44 or no front wall, the front trunk 18 is readily accessible by a user from a forward direction.

This disclosure includes a reinforcement assembly 54 configured to stiffen and reinforce the front end assembly 32 while maintaining the ease of access to the front trunk 18. In this regard, the reinforcement assembly 54 may be considered part of the front end assembly 32, especially when the hood 16 is closed. In particular, the reinforcement assembly 54 is mounted to the hood 16, moveable with the hood 16 as the hood 16 moves between the open and closed positions, and is configured to interface with the fixed parts (i.e., those parts not intended to move during normal use) of the front end assembly 32, namely the upper portions of the first and second vertical components 38, 40. In this example, the reinforcement assembly 54 includes a bar 56 mounted adjacent an underside and a forward-most edge of an upper panel 58 of the hood 16. The bar 56 exhibits a substantially rectangular cross-section in one example. The hood 16 in this example also includes a forward panel 60, which can provide a forward boundary of the front trunk 18. The bar 56 is mounted adjacent an inner surface of the forward panel 60. When the hood 16 is in the closed position, the bar 56 is vertically spaced-apart above the cross member 42 and extends substantially parallel to the cross member 42.

When the reinforcement assembly 54 is configured as a bar 56, the bar 56 includes features that are configured to fit relative to corresponding features of the front end assembly 32 while still permitting the hood 16 to open and close normally. Specifically, when the hood 16 is closed, the bar 56 is configured to contact the front end assembly 32 at locations adjacent the upper portions of the first and second vertical components 38, 40. The bar 56 and front end assembly 32 include corresponding features, examples of which will be discussed below, that are configured to ensure that the reinforcement assembly 54 fits appropriately relative to the front end assembly 32 and that the reinforcement assembly 54 effectively absorbs loads applied thereto and, in particular, transfers those loads to the front end assembly 32 and, in turn, the body structure 20.

A number of example interfaces will now be described. The reinforcement assembly 54, namely the bar 56, may include one or more of the example interfaces. For instance, one type of interface can be arranged adjacent one end of the bar 56, and another different type of interface can be arranged adjacent another end of the bar 56. Alternatively, each end of the bar 56 can include the same interface as the other, such that the bar 56 is substantially symmetrical. Further, each end of the bar 56 can include one or more of the example interfaces discussed below. Each example interface is especially configured to absorb loads applied to the reinforcement assembly 54 and/or to restrict movement between the reinforcement assembly 54 and the front end assembly 32 in one or more directions.

Figure 3:
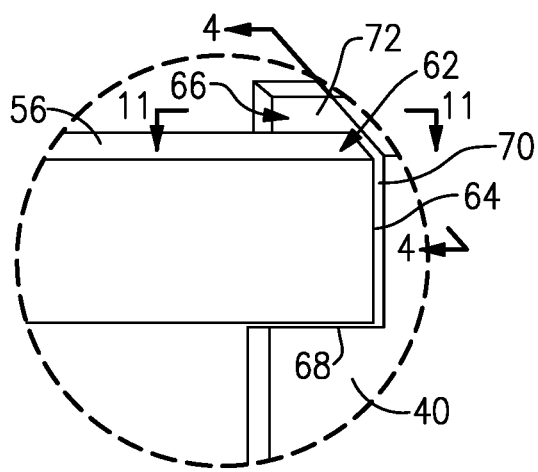
FIG. 3 is a close-up view of an example interface between a reinforcement assembly of the hood and the front end assembly of the vehicle.

FIG. 3 illustrates a first example interface from a front perspective. In particular, in FIG. 3, the hood 16 is in the closed position such an end section 62, adjacent a free end 64, of the bar 56 is received in a recess 66 formed in an upper portion of the second vertical component 40. The recess 66 is bound by three walls of the second vertical component 40, namely a bottom recess wall 68, an outer recess wall 70, and a rear recess wall 72. The recess 66 is open facing the forward direction, in this example. The recess 66 is also open facing the upward direction such that when the hood 16 is opened, the end section 62 of the bar 56 is removable from the recess 66. When a load is applied to the bar 56, the recess 66 is configured such that the bottom recess wall 68 restricts downward movement of the bar 56, the outer recess wall 70 restricts lateral movement of the bar 56 away from the centerline C, and the rear recess wall 72 restricts rearward movement of the bar 56. As such, when a load is applied to the bar 56, the front end assembly 32 readily absorbs it.

Figure 4:
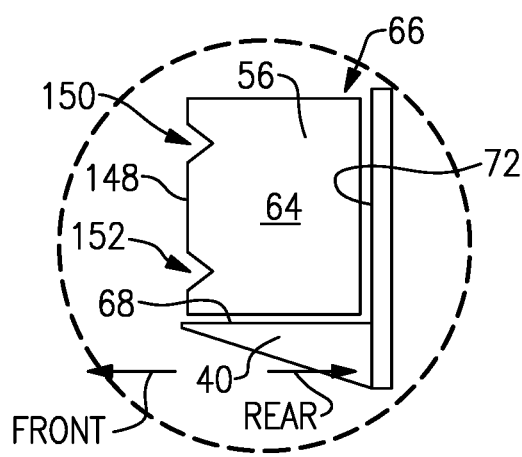
FIG. 4 is a side view of the example interface of FIG. 3, and is taken along line 4-4 from FIG. 3.
Figure 5:
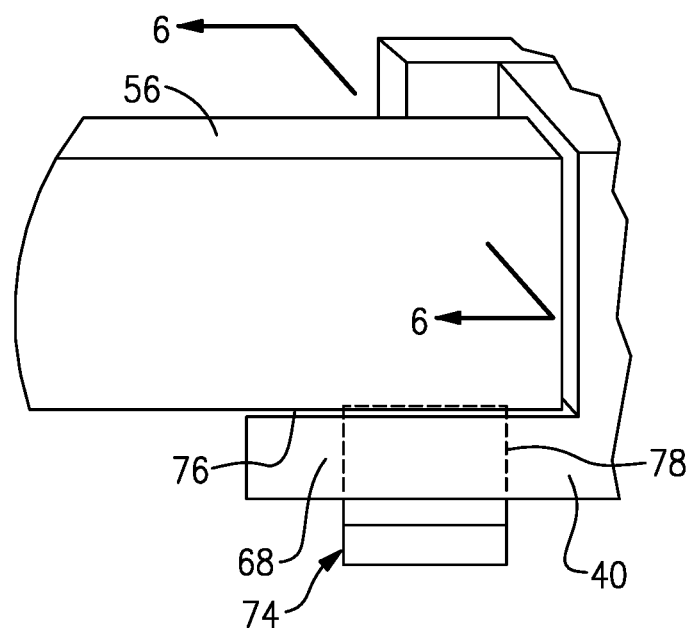
FIG. 5 is a close-up view of another example interface between a reinforcement assembly of the hood and the front end assembly of the vehicle.
Figure 6:
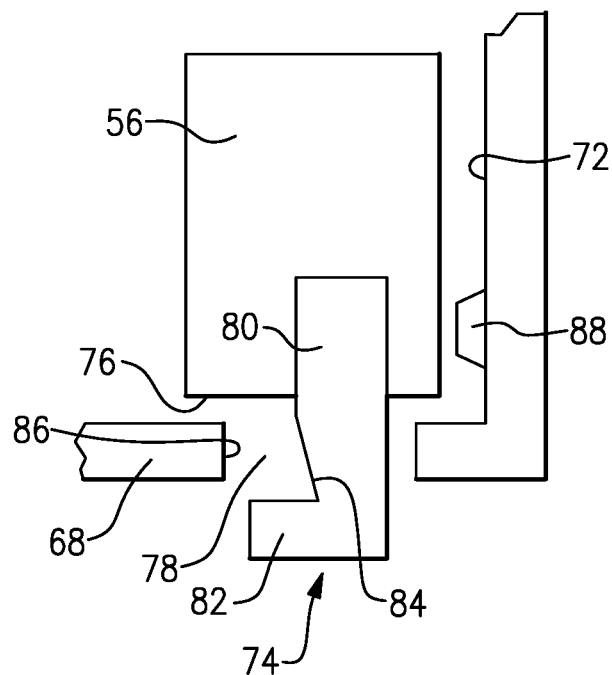
FIG. 6 is a view of the example interface of FIG. 5, and is taken along line 6-6 from FIG. 5.

FIGS. 5 and 6 illustrate another example interface substantially similar to that described relative to FIGS. 3 and 4 but with the addition of a tab 74 and other corresponding structures. In particular, in this example, a tab 74 projects downwardly from a bottom surface 76 of the bar 56 and through a channel 78 formed in the bottom recess wall 68. The tab 74 includes a main section 80 projecting downward and through the channel 78. The tab 74 further includes a hook 82 projecting substantially perpendicular from the main section 80. The main section 80 includes a reduced width section 84 which gradually tapers toward the hook 82.

The channel 78 is sized such that, during normal use, the tab 74 does not prevent the normal opening and closing of the hood 16. When the hood 16 is closed and a load is applied to the bar 56, however, the tab 74 and channel 78 are configured such that an upper surface of the hook 82 adjacent the reduced width section 84 will contact a bottom surface of a forward boundary 86 of the channel 78 (i.e., a bottom of a structure of the second vertical component 40 defining a boundary of the channel 78) such that the direct contact between the two structures will restrict upward movement of the bar 56 relative to the front end assembly 32.

In some examples, a projection 88 may project forward from the rear recess wall 66 to act as a fulcrum and promote the aforementioned contact between the hook 82 and the boundary 86. Specifically, the projection 88 will urge the hook 82 to the left-hand direction, relative to FIG. 6, in response to a load applied to the bar 56 in the right-hand direction. The projection 88 is arranged lower than a midpoint of the height of the bar 56, in this example. The projection 88 may be arranged in other locations, however, to achieve the desired engagement between the hook 82 and boundary 86.

Figure 7:
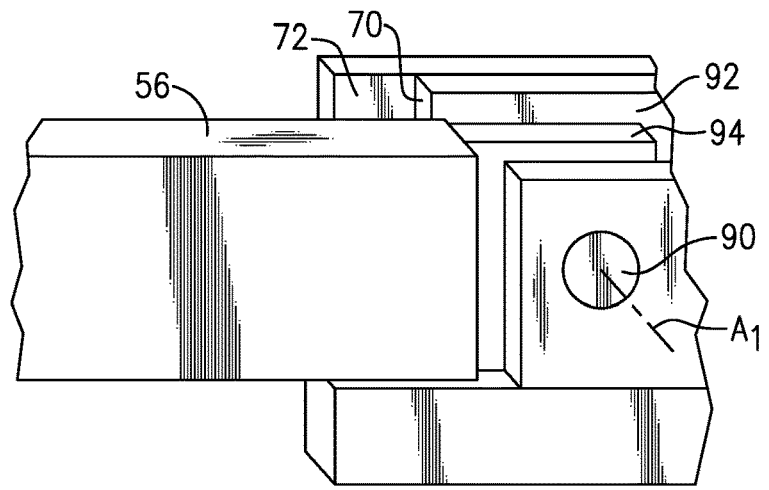
FIG. 7 is a close-up view of another example interface between a reinforcement assembly of the hood and the front end assembly of the vehicle.
Figure 8:
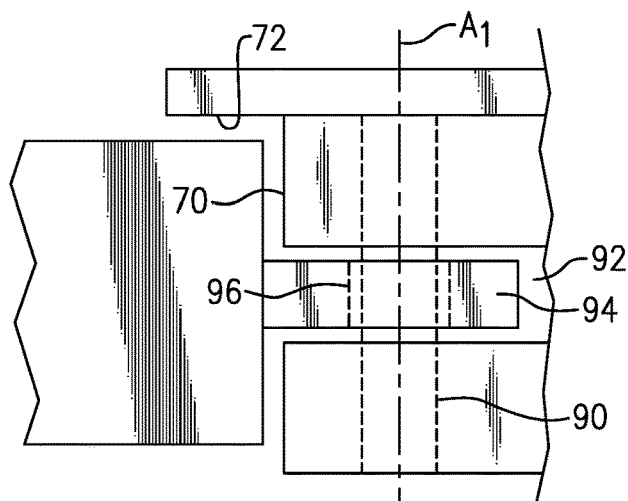
FIG. 8 is a top view of the example interface of FIG. 7.
Figure 9:
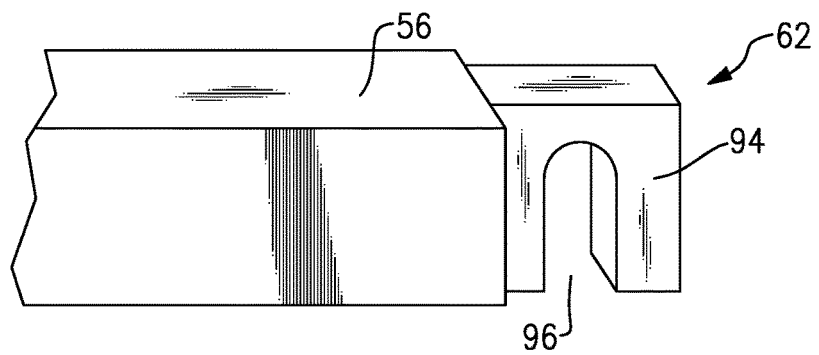
FIG. 9 is a perspective view of an end section of a bar for use with the interface of the FIG. 7.

Another example interface is shown relative to FIGS. 7-9. In FIGS. 7-9, a pin and slot are used to restrict relative movement of the bar 56 and the front end assembly 32. In particular, in FIG. 7, the second vertical component 40 includes a pin 90 extending along an axis Ai in a direction substantially parallel to the centerline C. The pin 90 is supported within a channel 92 formed in the outer recess wall 70. The end section 62 of the bar 56 includes a tab 94 projecting outward, away from the centerline C, therefrom. The tab 94 is configured to be received in the channel 92 when the hood 16 is in the closed position. The tab 94 has a slot 96 open facing downward. The slot 96 is sized and configured to be received over the pin 90 when the hood 16 is closed. The pin 90 and tab 94 are configured such that, when a load is applied to the bar 56, lateral movement (i.e., in a direction perpendicular to the centerline C) between the bar 56 and the front end assembly 32 is resisted. Further, in such conditions, the tab 94 is configured to contact the walls of the slot 96 to resist relative forward and rearward movement.

Figure 10:
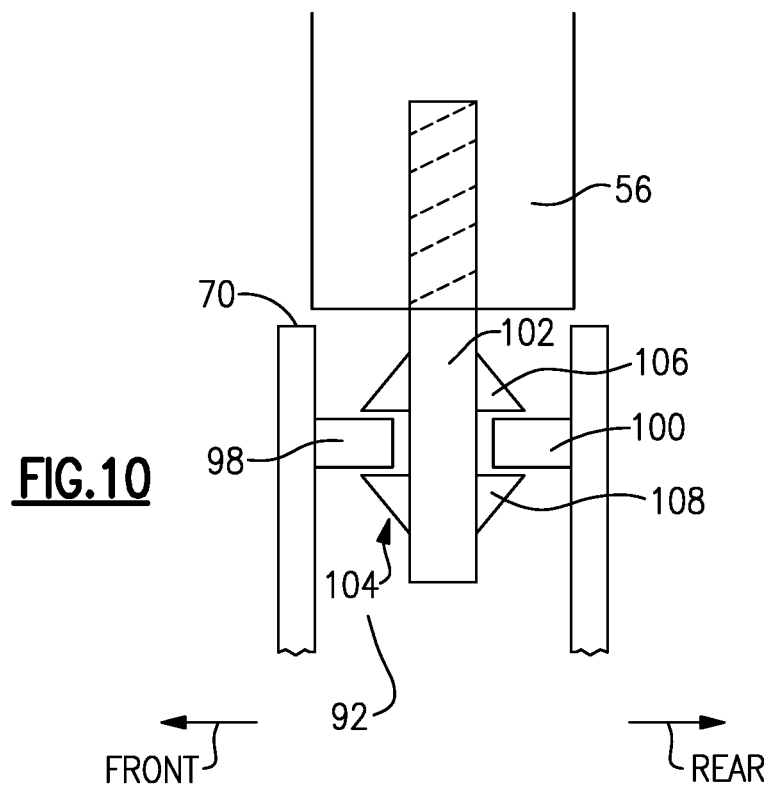
FIG. 10 is a top view of another example interface.

FIG. 10 is a view similar to FIG. 8 and illustrates another example interface. In this example, the channel 92 includes first and second opposed tabs 98, 100 projecting therefrom and extending only partially into the channel 92. While two tabs are shown, this disclosure extends to arrangements having one or more tabs. The tabs 98, 100 are aligned along the length (i.e., the up and down direction, relative to FIG. 11) of the channel 92 and are spaced-apart from one another such that a pin 102 projecting from the bar 56 can be fit between the tabs 98, 100. The pin 102, in this example, is threaded into the bar 56. The pin 102 could be connected to the bar 56 using another technique, however.

In this example, a collar 104 is mounted to the pin 102, such as by welding, for example. The collar 104 is configured to surround the tabs 98, 100 when the hood 16 is in the closed position. Specifically, the collar 104 includes a first collar member 106 and a second collar member 108. The first and second collar members 106, 108 are spaced-apart from one another along a length of the pin 102 by a distance greater than the width of the tabs 98, 100 such that, when the hood 16 is in the closed position, the first collar member 106 is closer to the centerline C than the tabs 98, 100 and the second collar member 108 is further away from the centerline C than the tabs 98, 100. Each collar member 106, 108 may be frustoconical in shape, with the pin 102 received in a central opening of the collar members 106, 108. The collar members 106, 108 could exhibit other shapes, however. The greatest width of each collar member 106, 108 is adjacent the tabs 98, 100, in this example. When a load is applied to the bar 56, engagement between the collar 104 and the tabs 98, 100 restricts relative lateral movement. Further, engagement between the pin 102 and the tabs 98, 100 and/or the walls of the channel 92 restricts relative forward and rearward movement.

Figure 11:
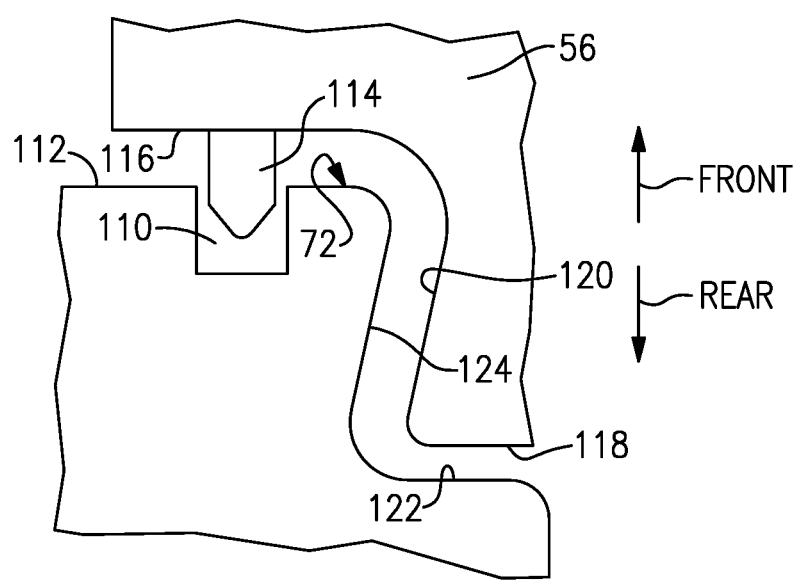
FIG. 11 is a top view of another example interface.

FIG. 11 illustrates another example interface, and in particular illustrates an example interface between the rear recess wall 72 and the bar 56. In FIG. 11, the rear recess wall 72 is configured such that it exhibits a gap, or recess, 110 in a first front-facing surface 112 thereof. The reinforcement assembly 54, namely the bar 56, includes a pin 114 projecting from a first rear-facing surface 116 thereof and configured such that, when the hood 16 is in the closed position, the pin 114 projects into the gap 110. The pin 114 includes a tapered free end and is otherwise sized and configured, relative to the gap 110, to permit the hood 16 to open while also restricting relative lateral movement (i.e., toward and away from the centerline C, which is in the left-to-right direction in FIG. 11) of the bar 56 with respect to the front end assembly 32.

In this example, the bar 56 and rear recess wall 72 are configured to mate when a load is applied to the bar 56 to restrict relative movement in the front and rear directions. In particular, in addition to the first rear-facing surface 116, the bar 56 includes a second rear-facing surface 118 extending parallel to the first rear-facing surface 116 and spaced-apart from the first rear-facing surface 116 by an inclined surface 120 lying in a plane non-perpendicular, specifically angled at greater than 90°, to planes containing the first and second rear-facing surfaces 116, 118. The rear recess wall 72 further includes a second forward-facing surface 122 and an inclined surface 124. The surfaces 112, 122, 124 of the rear recess wall 72 are spaced-apart from and parallel to the corresponding, adjacent surfaces 116, 118, 120 of the bar 56 in normal conditions. When a load is applied to the bar 56, however, the spacing in FIG. 12 between the bar 56 and the rear recess wall 72 reduces such that the inclined surfaces 120, 124 contact one another in a manner that restricts movement of the bar 56 in the front direction.

Figure 12:
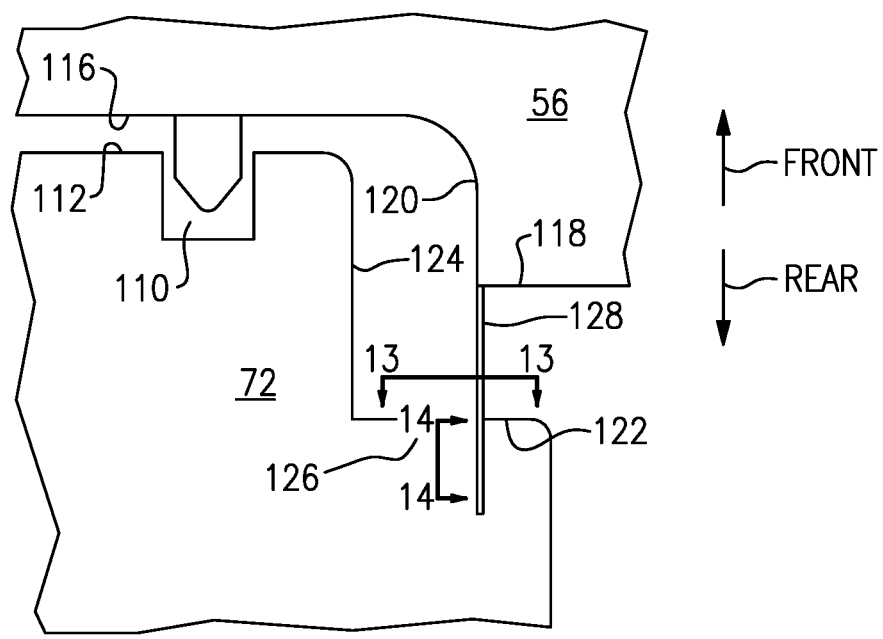
FIG. 12 is a top view of another example interface.
Figure 13:
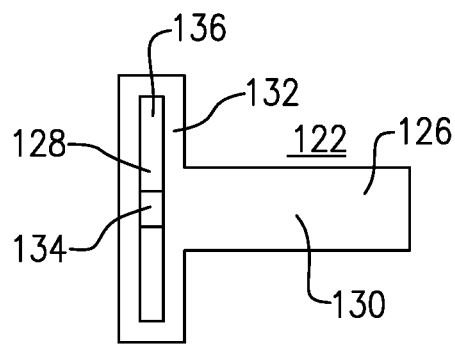
FIG. 13 is a cross-sectional view illustrating additional detail of the T-shaped slot and T-shaped tab of the interface of FIG. 12.
Figure 14:
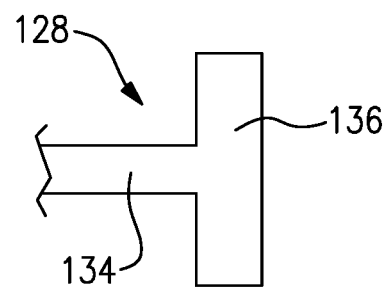
FIG. 14 is a cross-sectional view illustrating additional detail of the T-shaped tab of the interface of FIG. 12.

FIGS. 12-14 illustrate another example interface between the rear recess wall 72 and the bar 56. In FIG. 12, for example, the inclined surfaces 120, 124 are inclined at substantially 90° angles with respect to the adjacent surfaces 112, 116. The inclined surfaces 120, 124 could be inclined as in FIG. 11, however. In FIG. 12, the second forward-facing wall 120 includes a T-shaped slot 126. Further, the second rear-facing wall 118 of the bar 56 includes a T-shaped projection 128. The T-shaped slot 126 includes a first leg 130 having a length extending substantially perpendicular to the centerline C (i.e., in the left-to-right) direction in FIGS. 13 and 14, and a second leg 132 adjacent an end of the first leg 130 and having a length extending substantially perpendicular to the first leg 130. The T-shaped projection 128 includes a first leg 134 and a second leg 136. The first leg 134 has a length projecting from the second rear-facing surface 118 in a direction parallel to the centerline C (i.e., in the front-and-rear directions, generally up and down in FIG. 12) and the second leg 136 is adjacent the end of the first leg 134 and extends along its length substantially perpendicular to the first leg 134. Thus, the T-shaped slot 126 and T-shaped projection 128 generally approximate a T shape. While the bar 56 includes the projection and the rear recess wall 72 includes the slot, the projection could be provided on the rear recess wall 72 and the bar 56 could contain the slot.

In normal conditions, the T-shaped projection 128 is sized and shaped such that the first leg 134 projects partially into the second leg 132 of the T-shaped slot 126 and such that second leg 136 is entirely through the T-shaped slot 126 when the hood 16 is in the closed position. When a load is applied to the bar 56, the T-shaped projection 128 moves relative to the position of FIGS. 12 and 13 such that the first leg 134 projects through the first leg 130 of the T-shaped slot 126. As such, with the second leg 136 being larger than the first leg 130 (e.g., in the up-and-down direction, relative to FIG. 13), relative movement in the front-rear-directions is restricted.

Figure 15:
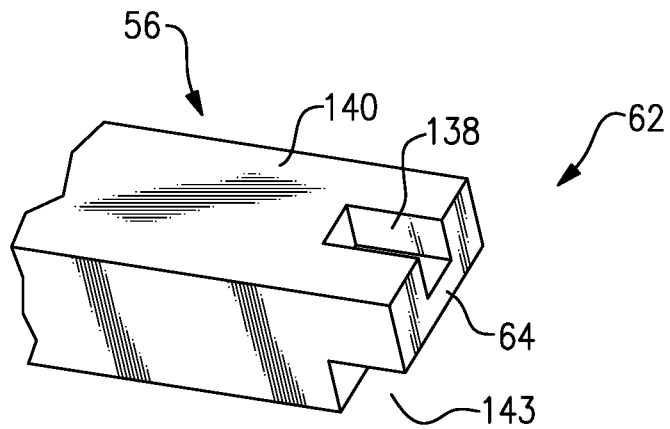
FIG. 15 is a perspective view of an end section of a bar for use with the interface of the FIGS. 16 and 17.
Figure 16:
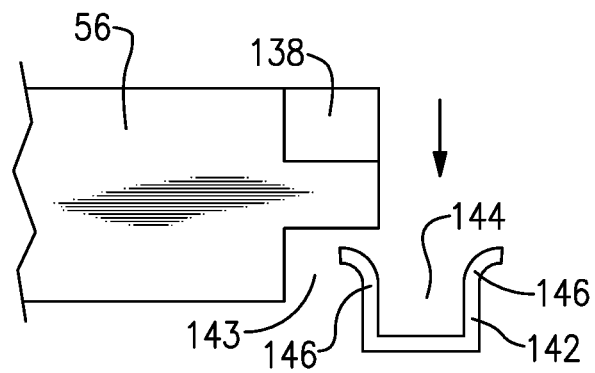
FIG. 16 is a close up view of another example interface.
Figure 17:
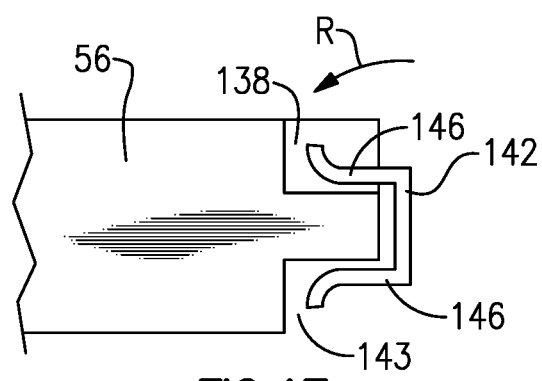
FIG. 17 is a close up view of another example interface.

FIGS. 15-17 illustrate another example interface, including a pivoting lock. In FIG. 15, the end section 62 of the bar 56 includes a channel 138 in an upper surface 140 and the end 64. The channel 138 is sized and configured to receive a pivoting lock 142. A recess 143 is provided in the bar 56 below the channel 138 to permit the pivoting lock 142 to pivot in a manner that engages the channel 138. As shown in FIG. 16, when the hood 16 is not in the closed position, the pivoting lock 142 is arranged such that a central channel 144 of the pivoting lock 142 is open facing an upward direction. As the hood 16 lowers, the pivoting lock 142, and in particular the arms 146, which may have rounded free ends, come into contact with the bar 56. The movement of the bar 56 in the downward direction causes the pivoting lock 142 to rotate substantially 90° in the direction R, which is counterclockwise relative to FIG. 17. The pivoting lock 142 may be biased to the position of FIG. 16 by a spring or other biasing member. When in the position of FIG. 17 (i.e., the locking position), the pivoting lock 142 prevents relative forward and rearward movement of the bar 56 and the front end assembly 32. The pivoting lock 142 may be held in the position of FIG. 17 by the latch of the hood 16, for example. The pivoting lock 142 may alternatively or additionally be held in the position of FIG. 17 by a detent, which provides an amount of force sufficient to hold the pivoting lock 142 in place but that is also readily overcome as a user opens the hood 16. The pivoting lock 142 may be pivotally mounted to one of the first and second vertical supports 38, 40.

Another aspect of this disclosure relates to providing the bar 56 with a reinforcement and/or stiffening feature. In an example, as shown in FIG. 4, the bar 56 may include one or more beads. In this example, a front surface 148 of the bar 56 includes first and second beads 150, 152. The beads 150, 152 have a length dimension extending in a direction perpendicular to the centerline C, parallel to the length of the bar 56, and in one example the beads 150, 152 extend along the entire length of the bar 56. The beads 150, 152 are V-shaped notches, in this example, recessed inward (i.e., in a direction parallel to the centerline C, in the right-hand direction relative to FIG. 4) relative to the front surface 148. The beads 150, 152 may be formed by roll-forming or another known manufacturing technique.

Figure 19:
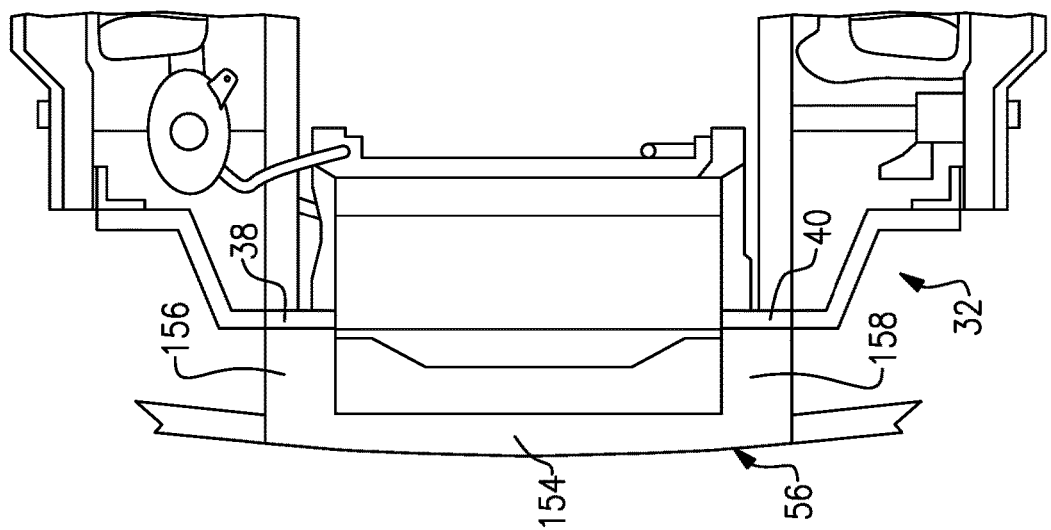
FIG. 19 is a top view of the example front end assembly and bar configuration of FIG. 18.
Figure 18:
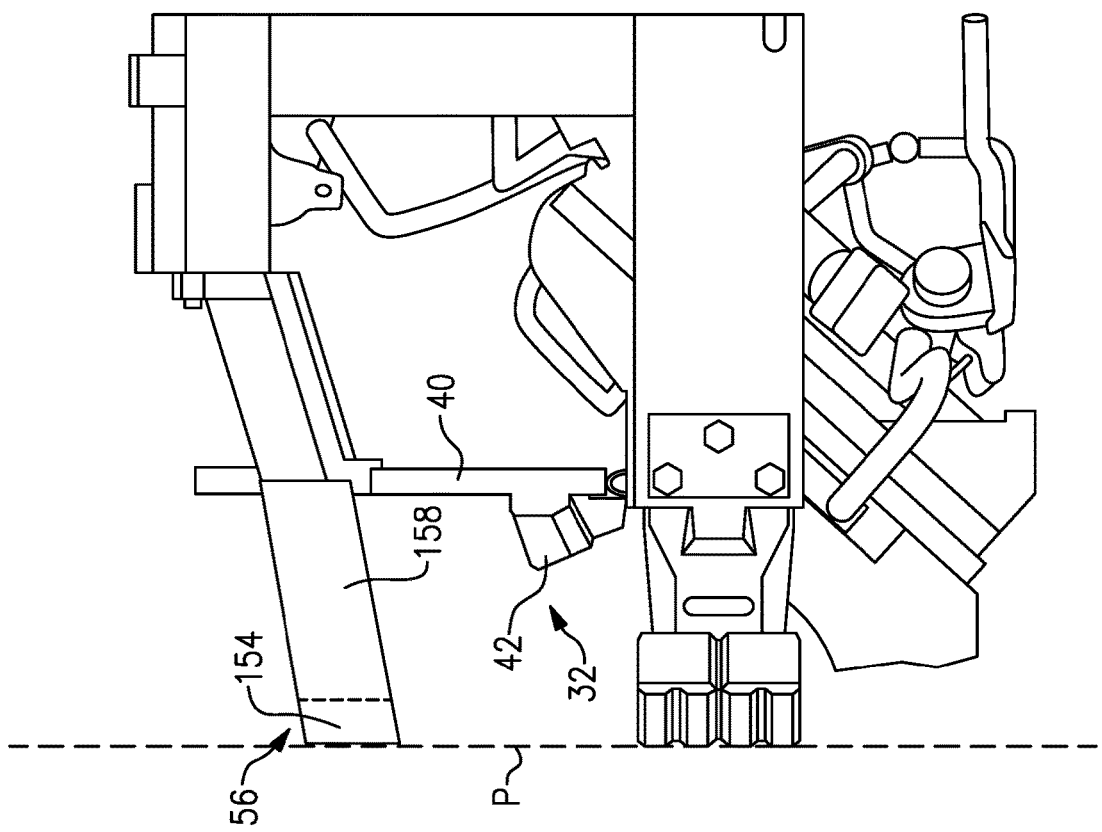
FIG. 18 is a side view of an example front end assembly with another bar configuration.

While the bar 56 may be a relatively straight bar in some examples, the bar 56 may be differently-shaped. For example, in FIGS. 18 and 19, the bar 56 includes a front section 154, a first rearwardly-extending section 156 projecting from a first side of the front section 154, and a second rearwardly-extending section 158 projecting from a second side of the front section 154 opposite the first side. The bar 56 of FIGS. 18 and 19 may interface with the front end assembly 32 adjacent ends of the first and/or second rearwardly-extending sections 156, 158 opposite the front section 154. Each of the front section 154 and the first and second rearwardly-extending sections 156, 158 are mounted relative to the hood 16 such that they are moveable with the hood 16. A forward face of the front section 154 may lie in a common plane P with a front bumper support 160 of the vehicle 10. The plane P may be spaced rearward of a forward-most point of the vehicle 10, and forward of the first and second vertical components 38, 40 and cross member 42.

It should be understood that terms such as "about," "substantially," and "generally" are not intended to be boundaryless terms, and should be interpreted consistent with the way one skilled in the art would interpret those terms. Further, directional terms such as "front," "rear," "lateral," "forward," "rearward," "upward," "downward," "vertical," "horizontal," etc., are used according to their normal meaning in the art and with respect to a normal orientation of the vehicle 10. Such directional terms are used for purposes of explanation and should not otherwise be construed as limiting.

Although the different examples have the specific components shown in the illustrations, embodiments of this disclosure are not limited to those particular combinations. It is possible to use some of the components or features from one of the examples in combination with features or components from another one of the examples. In addition, the various figures accompanying this disclosure are not necessarily to scale, and some features may be exaggerated or minimized to show certain details of a particular component or arrangement.

One of ordinary skill in this art would understand that the above-described embodiments are exemplary and non-limiting. That is, modifications of this disclosure would come within the scope of the claims. Accordingly, the following claims should be studied to determine their true scope and content.

The invention claimed is:

1. A motor vehicle, comprising:
   a front end assembly;
   a panel moveable relative to the front end assembly between a closed position and an open position; and
   a reinforcement assembly mounted to the panel and configured to interface with the front end assembly when the panel is in the closed position,
   wherein the front end assembly includes a first component and a second component spaced-apart from the first component,
   wherein, when the panel is in the closed position, the reinforcement assembly is configured to interface with both the first component and second components,
   wherein the front end assembly includes a cross member extending from the first component to the second component, and
   wherein, when the panel is in the closed position, the reinforcement assembly extends in a direction substantially parallel to the cross member.

2. The motor vehicle as recited in claim 1, wherein:
   at least one of the first component and the second component includes a channel, and
   the reinforcement assembly includes a tab configured such that, when the panel is in the closed position, the tab projects into the channel.

3. The motor vehicle as recited in claim 2, wherein the tab includes a hook.

4. The motor vehicle as recited in claim 1, wherein:
   at least one of the first component and the second component includes a pin, and
   the reinforcement assembly includes a tab having a slot configured such that, when the panel is in the closed position, the slot receives the pin.

5. The motor vehicle as recited in claim 1, wherein:
   at least one of the first component and the second component includes a channel and a tab projecting partially into the channel, and
   the reinforcement assembly includes a pin and a collar on the pin configured such that, when the panel is in the closed position, the collar surrounds the tab.

6. The motor vehicle as recited in claim 1, wherein:
   at least one of the first component and the second component includes a gap in a front-facing surface thereof, and the reinforcement assembly includes a pin projecting from a rear-facing surface thereof and configured such that, when the panel is in the closed position, the pin projects into the gap.

7. The motor vehicle as recited in claim 6, wherein:
the at least one of the first component and the second component includes a first surface and a second surface substantially parallel to one another and spaced-apart from one another by an inclined surface lying in a plane non-perpendicular to planes containing the first and second surfaces,
the reinforcement assembly includes a first surface and a second surface substantially parallel to one another and spaced-apart from one another by an inclined surface lying in a plane non-perpendicular to planes containing the first and second surfaces,
the gap is formed in the first surface of the at least one of the first component and the second component, and
the pin projects rearward of the first surface of the reinforcement assembly.

8. The motor vehicle as recited in claim 6, wherein:
the at least one of the first component and the second component includes a T-shaped slot, and
the reinforcement assembly includes a T-shaped tab configured such that, when the panel is in the closed position, the T-shaped tab is partially received in the T-shaped slot.

9. The motor vehicle as recited in claim 6, wherein:
the at least one of the first component and the second component includes a pivoting lock, and
the reinforcement assembly is configured to engage the pivoting lock such that, as the panel rotates to the closed position, the pivoting lock engages a channel in the reinforcement assembly and rotates into a locking position.

10. A motor vehicle, comprising:
a front end assembly;
a panel moveable relative to the front end assembly between a closed position and an open position; and
a reinforcement assembly mounted to the panel and configured to interface with the front end assembly when the panel is in the closed position,
wherein the reinforcement assembly is provided by a bar.

11. The motor vehicle as recited in claim 10, wherein the bar exhibits a substantially rectangular cross-section.

12. The motor vehicle as recited in claim 10, wherein a front surface of the bar includes at least one roll-formed bead.

13. The motor vehicle as recited in claim 10, wherein the bar includes a front section, a first rearwardly-extending section projecting from a first side of the front section, and a second rearwardly-extending section projecting from a second side of the front section opposite the first side.

14. The motor vehicle as recited in claim 1, further comprising a front trunk arranged within the front end assembly, wherein the panel is configured to selectively cover and uncover the front trunk.

15. The motor vehicle as recited in claim 14, wherein:
the front trunk includes a front wall, rear wall, first and second side walls, and a bottom wall, and
the front wall projects a lower height above the bottom wall than the rear wall.

16. The motor vehicle as recited in claim 1, wherein the panel is a hood.

17. An assembly for a motor vehicle, comprising:
a front trunk including a front wall, rear wall, first and second side walls, and a bottom wall, wherein the front wall projects a lower height above the bottom wall than the rear wall;
a front end assembly including a first component adjacent the first side wall of the front trunk, a second component adjacent the second side wall of the front trunk, and a cross member extending from the first component to the second component;
a hood moveable relative to the front end assembly between a closed position and an open position to selectively cover and uncover the front trunk; and
a bar mounted to the hood and configured such that, when the hood is in the closed position, the bar interfaces with the first and second components of the front end assembly and extends in a direction substantially parallel to the cross member.

18. The assembly as recited in claim 17, wherein:
the bar exhibits a substantially rectangular cross-section,
a front surface of the bar includes at least one roll-formed bead, and
the bar includes a front section, a first rearwardly-extending section projecting from a first side of the front section, and a second rearwardly-extending section projecting from a second side of the front section opposite the first side.

* * * * *